United States Patent
Arvidsson et al.

(10) Patent No.: US 6,220,299 B1
(45) Date of Patent: Apr. 24, 2001

(54) TWO-WAY VALVE

(75) Inventors: Lars Arvidsson, Dalby; Nina Brunk, Uppsala; Jörgen Jönsson, Sjöbo; Malte Lennerstedt, Lund; Ingmar Malm, Hörby; Christian Merheim, Helsingborg; Elizabeta Naumovska, Göteborg; Joakim Ragnarsson, Växjö, all of (SE)

(73) Assignee: Gambro Lundia AB (SE)

( * ) Notice: Subject to any disclaimer, the term of this patent is extended or adjusted under 35 U.S.C. 154(b) by 0 days.

(21) Appl. No.: 09/424,994

(22) PCT Filed: Jun. 5, 1998

(86) PCT No.: PCT/SE98/01080

§ 371 Date: Apr. 19, 2000

§ 102(e) Date: Apr. 19, 2000

(87) PCT Pub. No.: WO98/55785

PCT Pub. Date: Dec. 10, 1998

(30) Foreign Application Priority Data

Jun. 5, 1997 (SE) .................................................. 9702167

(51) Int. Cl.⁷ ..................................................... F16K 11/14
(52) U.S. Cl. ...................................... 137/863; 137/329.05
(58) Field of Search ............................... 137/329.05, 863

(56) References Cited

U.S. PATENT DOCUMENTS

| | | | |
|---|---|---|---|
| 998,543 | * | 7/1911 | Meyer ............................. 137/329.05 |
| 1,618,119 | * | 2/1927 | Walling ........................... 137/329.05 |
| 3,296,026 | * | 1/1967 | Long ............................... 137/329.05 |
| 4,431,019 | | 2/1984 | Kopp et al. . |
| 5,653,422 | * | 8/1997 | Pieloth et al. .................... 251/129.2 |

FOREIGN PATENT DOCUMENTS

| | | |
|---|---|---|
| 1 425 632 | 11/1968 | (DE) . |
| 0 085 298 B1 | 6/1986 | (EP) . |
| 0 578 168 A1 | 7/1993 | (EP) . |
| 180 779 | 9/1962 | (SE) . |

\* cited by examiner

Primary Examiner—John Fox
(74) Attorney, Agent, or Firm—Lerner, David, Littenberg, Krumholz & Mentlik, LLP

(57) ABSTRACT

Valves are disclosed including a housing having at least one fluid inlet and at least one fluid outlet, a valve seat for at least one of the fluid inlets and fluid outlets, a diaphragm movable between a first position engaged with the valve seat and a second position disengaged from the valve seat, the diaphragm having a surface area which is greater than the size of the valve seat so that the surface area of the diaphragm is greater than the surface area necessary for abutment against the valve seat, an actuator for actuating the diaphragm between the first and second positions, and an activator for displacing the diaphragm whereby at least partially portions of the surface area of the diaphragm are exposed to the valve seat upon displacement of the diaphragm.

11 Claims, 3 Drawing Sheets

TWO-WAY VALVE

FIELD OF THE INVENTION

The present invention relates to a multi-way valve for a fluid, such as a liquid or gas.

BACKGROUND OF THE INVENTION

A prior art valve is disclosed in U.S. Pat. No. 4,431,019; and European Patent Nos. 0,578,168 and 0,085,298.

The valve according to the present invention is particularly intended to be used in a dialysis machine which, in its liquid-preparation stage, comprises a plurality of valves of this type. These valves are usually solenoid-operated. The valve can be of the one-way or two-way type or any multi-way type of valve.

These types of valves are provided with a diaphragm which abuts a valve seat in the valve. Wear arises during operation of the valve and abutment of the diaphragm against the valve seats. The function of the valve deteriorates and after a certain period of time leakage arises. In order to ensure reliable operation of these valves, the diaphragm is thus exchanged once a year. This implies that a service engineer travels out to the machine and disassembles the machine and all of the valves to exchange the diaphragms. The costs for this service are therefore high, and particularly the labor costs.

It has been proposed to arrange the diaphragm in some form of cassette which would be simpler to exchange to thereby reduce the precautionary service time.

One object of the present invention is thus to provide an arrangement in a valve which permits simplified procedures during such precautionary services.

A further object of the present invention is to suggest a construction which implies that the diaphragm does not need to be exchanged, whereby the service costs can be radically reduced.

The present invention thus relates to a valve comprising at least one inlet and at least one outlet for a fluid such as a liquid or gas. The inlet and/or the outlet are provided with a valve seat for cooperation with a diaphragm. An operating arrangement causes the diaphragm to abut the valve seat for selective operation of the valve.

SUMMARY OF THE INVENTION

In accordance with the present invention, these and other objects have now been realized by the invention of a valve comprising a housing including at least one fluid inlet, and at least one fluid outlet, a valve seat for at least one of the fluid inlet and the fluid outlet, the valve seat having a predetermined size, a diaphragm movable between a first position engaged with the valve seat and a second position disengaged from the valve seat, the diaphragm having a predetermined surface area which is greater than the predetermined size of the valve seat whereby the predetermined surface area of the diaphragm is greater than a surface area necessary for abutment against the valve seat, an actuator for selectively actuating the diaphragm between the first and second positions, and an activator for displacing the diaphragm whereby an at least partially unused portion of the predetermined surface area of the diaphragm is exposed to the valve seat upon the displacement of the diaphragm. Preferably, the fluid comprises a liquid or a gas.

In accordance with one embodiment of the valve of the present invention, the diaphragm is circular and has a center, and the activator is adapted to rotate the diaphragm about the center. Preferably, the activator is adapted to rotate the diaphragm through an angle of between about 10 and 45°, and preferably to an angle of about 18°.

In accordance with another embodiment of the valve of the present invention, the activator is adapted to linearly displace the diaphragm in a direction substantially perpendicular to the valve seat.

In accordance with another embodiment of the valve of the present invention, the activator is adapted to displace the diaphragm stepwise by an amount whereby a completely unused portion of the predetermined surface area of the diaphragm is exposed to the valve seat upon the displacement.

In accordance with another embodiment of the valve of the present invention, the activator includes locking means for preventing reintroduction of a previously exposed portion of the predetermined surface area of the diaphragm to exposure to the valve seat upon the displacement.

In accordance with another embodiment of the valve of the present invention, the housing includes a pair of fluid outlets, and including a valve seat for each of the pair of fluid outlets.

In accordance with another embodiment of the valve of the present invention, the valve includes a power source for operating the activator. Preferably, the power source comprises a solenoid or motor.

According to the present invention, the diaphragm has a dimension which is greater than that which is necessary for abutment against the valve seat. Furthermore, an activation arrangement is provided for displacement of the diaphragm so that a new, at least partially unused, region of the diaphragm is exposed to the valve seat.

Preferably, the diaphragm is circular, whereby the activation arrangement rotates the diaphragm about its center so that a new sector is exposed to the valve seat. The rotation can take place through an angle of about 10°–45°, particularly 18°, depending on the desired operating life.

Alternatively, the diaphragm can be displaced linearly and substantially perpendicular to the valve seat.

The diaphragm can be displaced in steps by an amount such that a completely new portion of the diaphragm is exposed to the valve seat.

Alternatively, displacement can take place substantially continuously or in small steps so that the diaphragm is continuously, or substantially continuously, renewed.

Preferably, a locking arrangement is provided which prevents return of a previously exposed portion of the diaphragm to exposure to the valve seat.

The valve is preferably a two-way valve which comprises an inlet and two outlets, these being aligned with each other and whereby each outlet has a valve seat.

The activation arrangement can be powered by a power source such as a solenoid or motor. In this manner, there is no longer any need to dismantle the machine; instead "exchange" of the diaphragm can be initiated electrically, for example by pressing a button or via a micro-computer which may be remote controlled.

BRIEF DESCRIPTION OF THE DRAWINGS

Further features, advantages and properties of the two-way valve according to the present invention will be apparent from the following detailed description of the invention and with reference to the drawings, in which.

DETAILED DESCRIPTION

Figure 1:
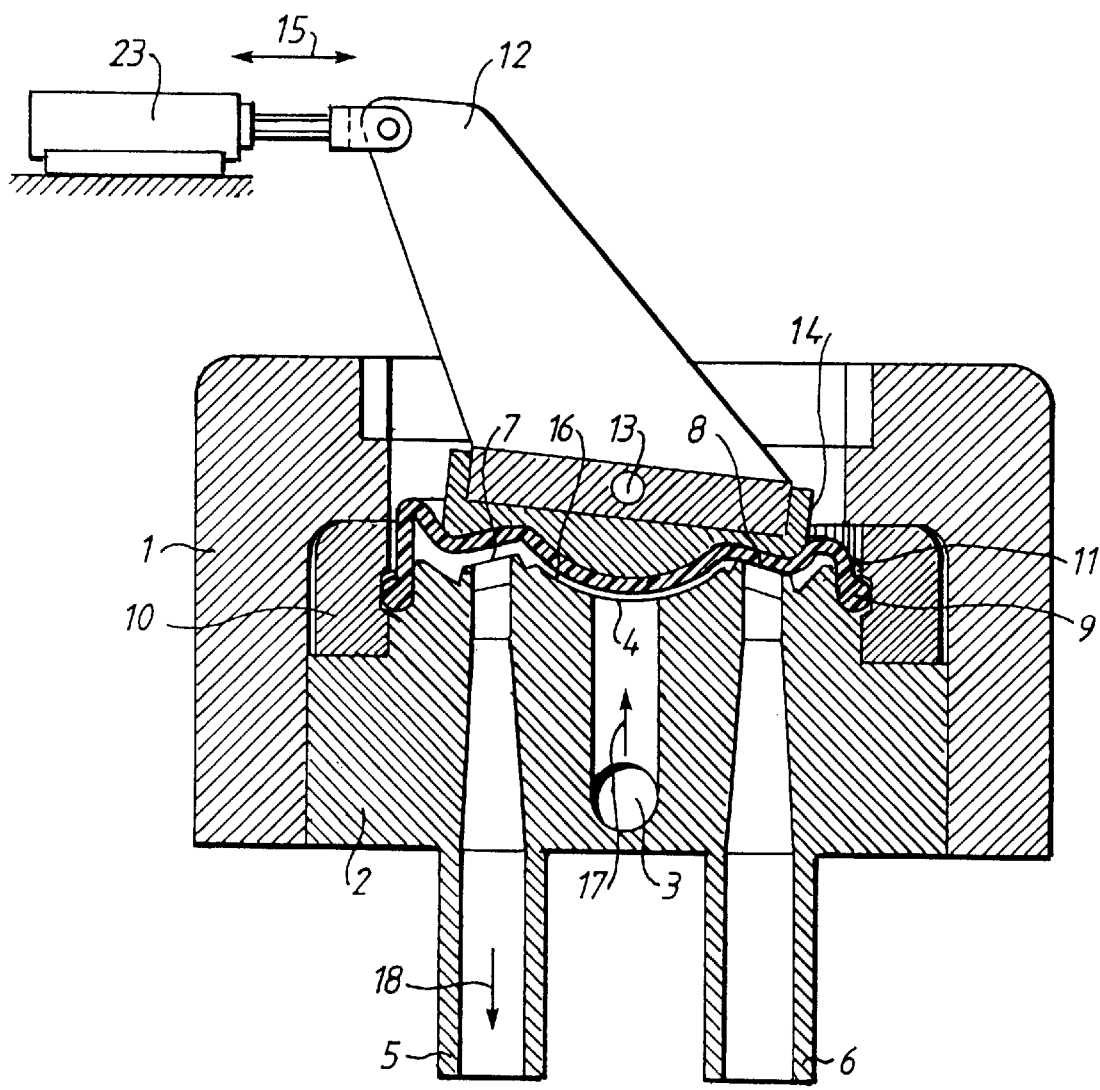
FIG. 1 is a side, elevational, partially sectional view of the valve according to the present invention.

The valve which is shown in FIG. 1 comprises an outer housing 1 provided with an inner housing 2. The inner housing 2 comprises an inlet 3 which extends perpendicular to the plane of the paper and thereafter bends upwardly 90° and discharges centrally in the upper surface of the inner housing 2, marked at 4. The inner housing 2 further comprises a first outlet 5 and a second outlet 6. The outlets 5 and 6 have openings defined by valve seats, 7 and 8, in the upper surface of the inner housing 2.

Figure 2:
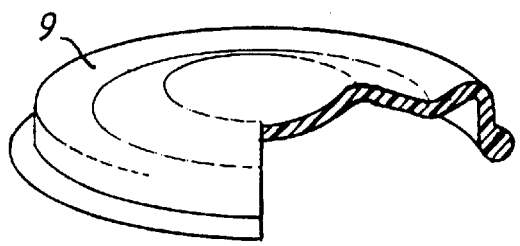
FIG. 2 is a perspective, partially sectional view of a diaphragm used in the valve according to FIG. 1.

The upper surface of the inner housing is covered by an elastic diaphragm or a membrane 9 having the general shape illustrated in FIG. 2. The membrane is symmetrically circular, i.e. round when seen from above in FIG. 2. The membrane 9 is affixed to a circular ring 10 by means of a suitable adhesive 11.

Figure 3:
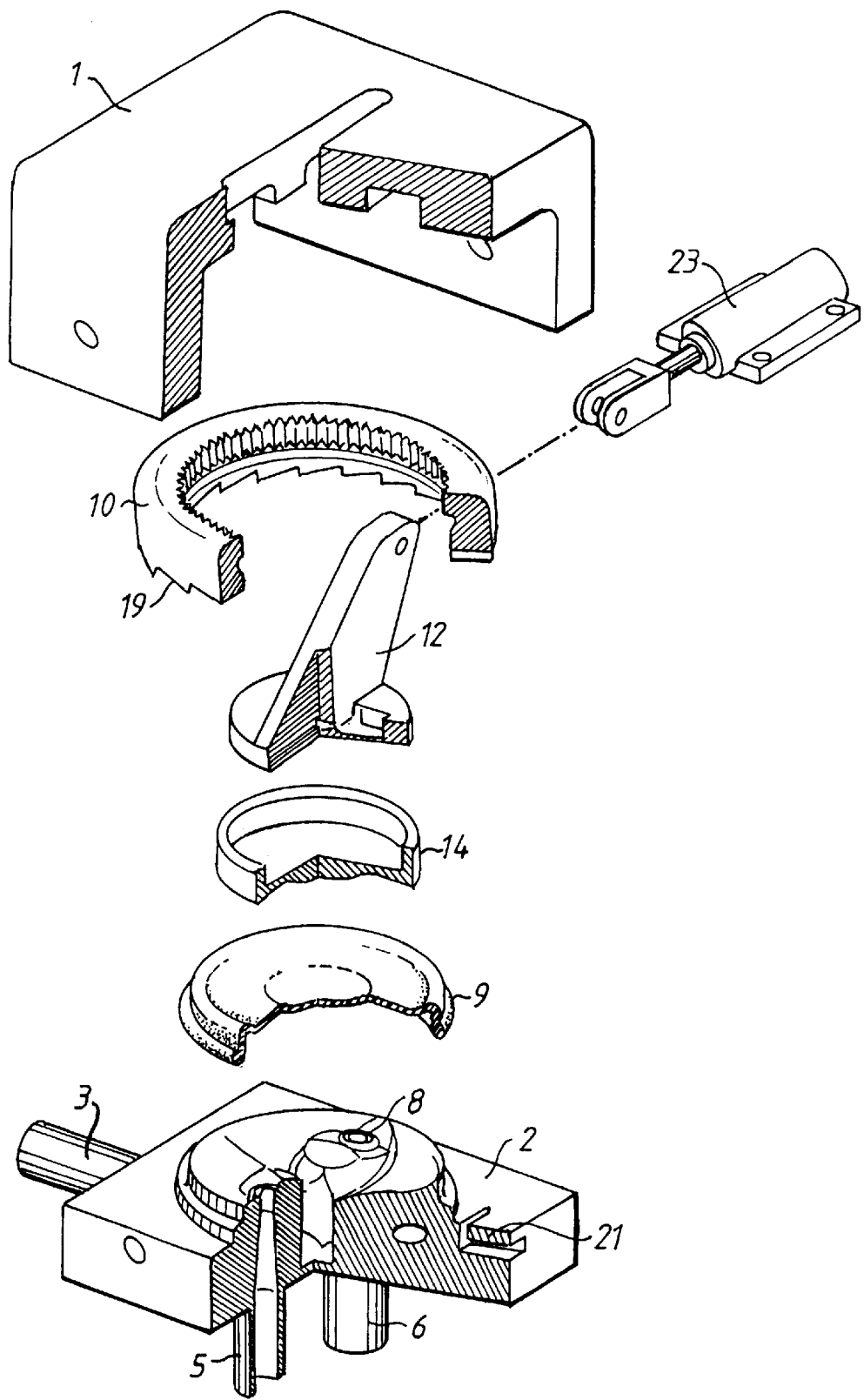
FIG. 3 is an exploded, partially sectional view of the valve shown in FIG. 1.

An activator lever 12 is pivotable about an axis 13. The lower end of the lever 12 is provided with a liner 14 having a symmetrically circular cross section generally corresponding to the upper surface of the membrane 9, as shown in FIG. 1 and FIG. 3.

When the lever 12 is rotated about an axis 15 according to the arrow 15, the membrane 9 is pressed against the valve seat 8 as shown in FIG. 1. If the lever 12 is rotated in the other direction, the membrane 9 is instead pressed against the valve seat 7.

The membrane 9 leaves the inlet opening 4 substantially free by means of a cavity 16 between the upper surface of the inner housing 2 and the membrane 9. Accordingly, liquid can flow from the inlet 3 through the cavity 16 to the open valve seat 7 and out through the outlet 5, as indicated by the arrows 17 and 18. If the lever 12 is pivoted to the left in FIG. 1, the valve seat 8 is opened instead and the liquid flows out through the outlet 6 instead. Actuation of the lever 12 is preferably achieved by means of a solenoid 23.

The membrane 9 in such a valve is subjected to considerable wear around the region of the valve seats, 7 and 8. In order to ensure a reliable functioning of the valve, the membrane is therefore regularly exchanged, for example once a year, as mentioned above.

According to the present invention, an increased working life for the membrane is achieved due to the fact that it is arranged to be rotatable so that new, unused portions of the membrane can be exposed to a valve seat instead of having to exchange the membrane in its entirety.

According to the present invention, the membrane 9 is affixed to a ring 10. The ring 10 and the membrane 9 are divided up into ten (or twenty) sectors, each comprising 18° of a circle. When the membrane is to be exchanged after one year, the engineer simply rotates the ring 10 through 18°, whereby a new, undamaged portion of the membrane 9 is exposed to the valve seats, 7 and 8. In this manner, the membrane can be "exchanged" without having to dismantle the valve. This "exchange" can take place 10 times, whereby the working life of the valve becomes 10 years, assuming that exchange is decreed once a year.

The material of the membrane 9 is preferably silicon rubber (polydimethylsiloxane) of the type known as WACKER 3003. This membrane material should have a possible working life of about 10 years or at least 5 years.

Remaining parts of the valve are made from PEEK (polyetheretherketone) which is a thermoplastic material with good chemical resistance and good flow properties at the operating temperatures in question.

Figure 4:
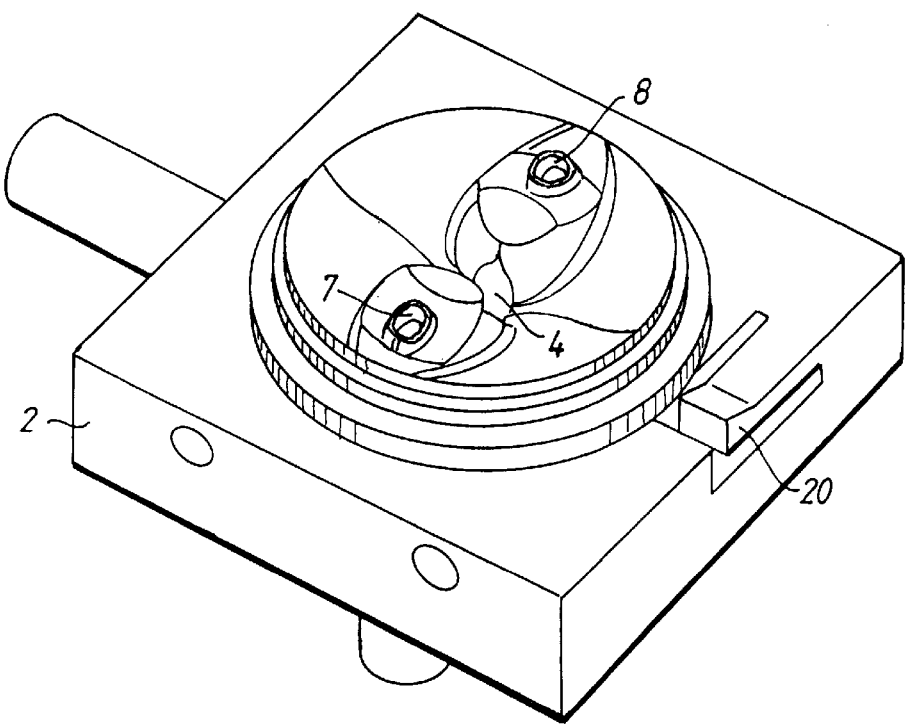
FIG. 4 is a top, perspective view showing the valve seats used in the present invention in greater detail.

In order to prevent return rotation of the ring 10 and the membrane 9, the ring 10 is provided with teeth 19 which cooperate with a backing pawl 20 arranged in the inner housing 2 (see FIG. 4). The teeth are spaced at 18° intervals. Thus, when the ring 10 is rotated one notch, this corresponds to one "exchange" of the membrane 9 since a new, completely unused sector of the membrane is wound forward and exposed to the valve seats.

The ring 10 can be provided with engagements for a tool which provides for rotation of the ring through 18° without having to disengage the tool. By placing the tool in a correct position and rotating it as far as possible, precisely the correct displacement of the membrane is attained.

The ring 10 can be provided with a spring arrangement (not shown) which biases the ring 10 towards the backing pawl so that the teeth engage with the backing pawl as soon as a tooth has ridden over the backing pawl.

Figure 5:
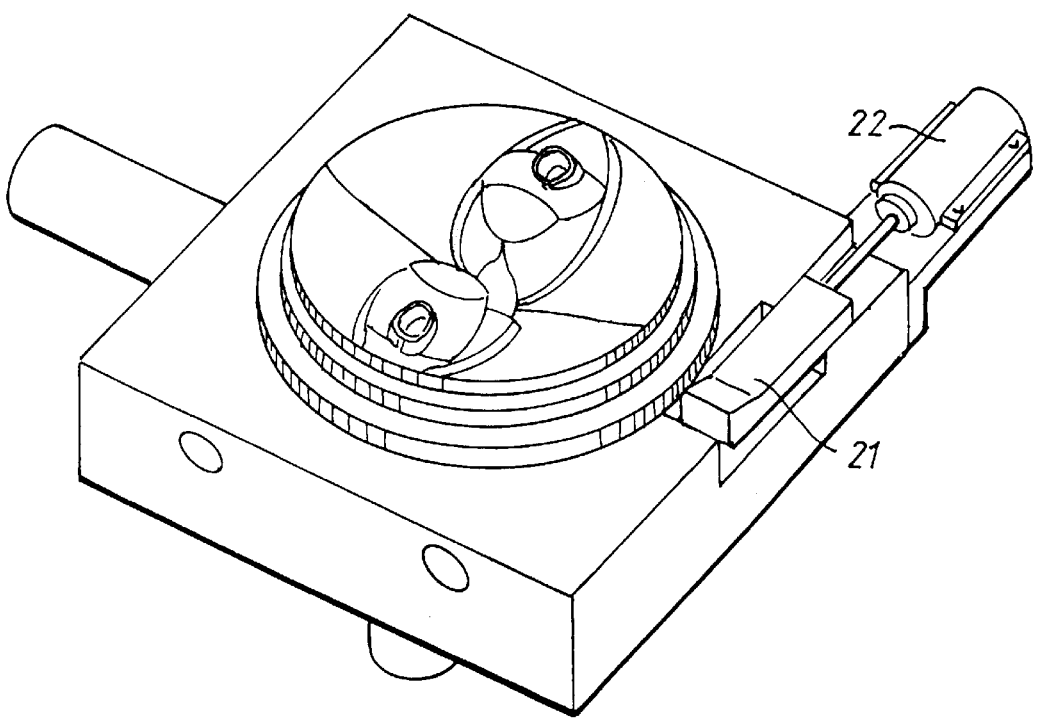
FIG. 5 is a top, perspective view similar to that in FIG. 4, but of an alternative embodiment of the present invention.

The backing pawl can be located on a displaceable carriage 21, as indicated in FIG. 5. The carriage is displaced by a solenoid or motor 22. When the solenoid 22 is activated, the carriage 21 is displaced towards the solenoid and thus passes a tooth 19 in the ring 10 located thereabove (see FIG. 3 in which the backing pawl 21 is partially shown). Thereafter, the carriage 22 is returned to the position shown in FIG. 5 either by spring force or actively by means of the solenoid 22 and thereby takes with it the ring 10 and the membrane 9.

The actuation of the solenoid takes place electrically and can take place manually by actuating a push-button on or in the machine.

Preferably, the computer in the dialysis machine is pre-programmed to actuate the solenoid after a number of operating hours corresponding to the expected working life for each valve, which of course can be different for different valves.

Alternatively, or complementarily, the actuation can occur by remote control, for example through telephone lines or radio signals for remote service.

The upper surface of the insert 2 having the valve seats 7 and 8 is shown in FIG. 4. These valve seats have an oval form or egg shape in order to permit the largest possible surface without taking up too great a region of the sector-shaped membrane surface. The valve seats thus have an inwardly tapering cross-sectional surface towards the center.

In addition, the inlet 4 is shown arranged at the center and with a flow distribution which is designed to avoid formation of regions with stagnating liquid flow.

As is apparent from FIG. 3, the inside of ring 10 is provided with a plurality of projecting ribs. These cooperate with the membrane 9 and serve to ensure that the membrane rotates together with the ring. The liner 14 is affixed to the membrane and also rotates therewith.

The joining of the liner 14, the membrane 9 and the ring 10 can be achieved by means of a suitable adhesive. A further alternative is to first injection-mold the membrane 9 and thereafter injection-mold the two other components 10 and 14 directly on the membrane 9, whereby adhesion is created already during manufacturing.

In an alternative embodiment of the present invention, the membrane is formed during manufacture so that it already comprises segments of 18°. The membrane is thereby provided with ridges which create a suitable division. Naturally, other divisions can be used, for example 30° for a working life of six years, etc.

The membrane 11 and the ring 10 preferably have a circular cross section. The insert 2 and the housing 1 can have an arbitrary cross section and, in a preferred embodiment, are rectangular.

It is possible within the scope of the present invention that other membrane shapes can be used. In particular, the membrane can be rectangular and displaced linearly, substantially perpendicular to the plane of the valve seats.

It is not necessary to displace the membrane so far that a completely unused region of the membrane is exposed to the valve seats. In an alternative embodiment, the membrane is displaced only a short distance of a few millimeters each time, or continuously, so that new material is exposed to the valve seats more or less continuously.

Such small displacements can take place each time the valve is activated. Suitably, however, such displacements do not take place during normal operation, but instead during periods when the machine is not in use. In this manner, execution of functional checks of the machine before the machine is used are facilitated.

The present invention has been described above with reference to the embodiment of the invention shown in the drawings. The various components can, however, be combined in different ways within the scope of the invention.

What is claimed is:

1. A valve for use in a medical device comprising a housing including at least one fluid inlet, and first and second fluid outlets, a valve seat for each of said first and second fluid outlets, said valve seats each having a predetermined size, a diaphragm movable between a first position engaged with said valve seat corresponding to said first fluid outlet and a second position disengaged therefrom, said diaphragm when engaged with one of said valve seats being disengaged from the other of said valve seats, said diaphragm having a predetermined surface area which is greater than said predetermined size of each of said valve seats whereby said predetermined surface area of said diaphragm is greater than a surface area necessary for abutment against said valve seats, an actuator for selectively actuating said diaphragm between said first and second positions, and an activator for displacing said diaphragm whereby an at least partially unused portion of said predetermined surface area of said diaphragm is exposed to at least one of said valve seats upon said displacement of said diaphragm.

2. The valve of claim 1 wherein said fluid comprises a liquid or gas.

3. The valve of claim 1 wherein said diaphragm is circular and has a center, and said activator is adapted to rotate said diaphragm about said center.

4. The valve of claim 3 wherein said activator is adapted to rotate said diaphragm through an angle of between about 10 and 45°.

5. The valve of claim 4 wherein said activator is adapted to rotate said diaphragm through an angle of about 18°.

6. The valve of claim 1 wherein said actuator is adapted to linearly displace said diaphragm in a direction substantially perpendicular to said valve seat.

7. The valve of claim 1 wherein said activator is adapted to displace said diaphragm stepwise by an amount whereby a completely unused portion of said predetermined surface area of said diaphragm is exposed to at least one of said valve seats upon said displacement.

8. The valve of claim 1 wherein said activator includes locking means for preventing reintroduction of a previously exposed portion of said predetermined surface area of said diaphragm to exposure to each of said valve seats upon said displacement.

9. The valve of claim 1 including a power source for operating said activator.

10. The valve of claim 9 wherein said power source comprises a solenoid or motor.

11. The valve of claim 1, wherein said diaphragm when in said second position is engaged with said valve seat corresponding to said second fluid outlet.

\* \* \* \* \*